United States Patent Office

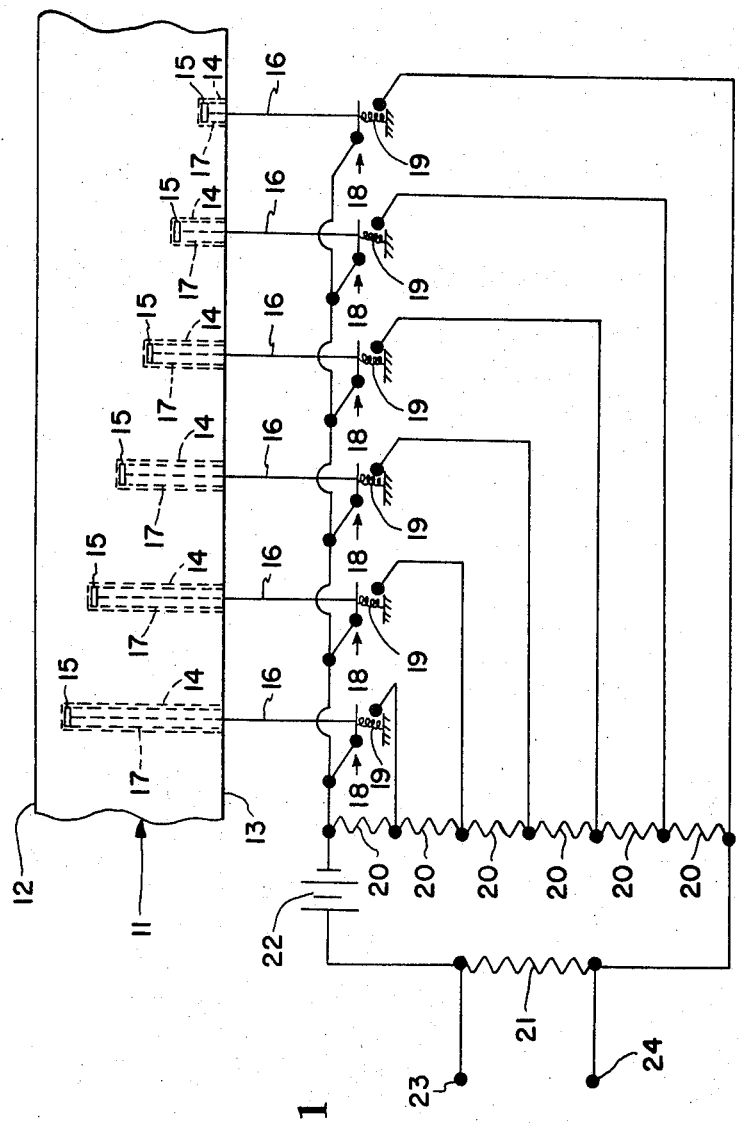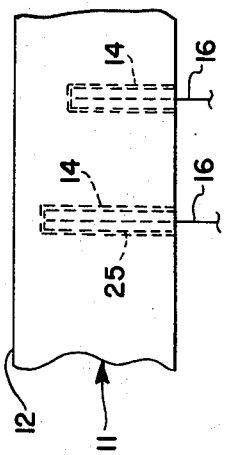

3,425,268
Patented Feb. 4, 1969

3,425,268
ABLATION SENSOR
Clifford H. Nelson, Newport News, and Charles A. Gurtler, Yorktown, Va., assignors to the United States of America as represented by the National Aeronautics and Space Administration
Filed Mar. 22, 1965, Ser. No. 441,936
U.S. Cl. 73—86          10 Claims
Int. Cl. G01n 17/00

ABSTRACT OF THE DISCLOSURE

A device for measuring the surface recession of charring and noncharring ablators. Pieces of ablative material are embedded in the ablation material at different predetermined levels. Each piece of ablative material holds a switch open until the ablation material ablates to the piece of ablative material. Then the piece of ablative material melts thereby allowing the switch to close. An electrical circuit is used to monitor all of the switches to determine the ones that are open and the ones that are closed.

---

The invention described herein may be manufactured and used by or for the Government of the United States of America for governmental purposes without the payment of any royalties thereon or therefor.

This invention relates to an ablation sensor, and more particularly concerns an ablation sensor that can be used to measure during flight the surface recession of charring and noncharring ablators.

Measurements of the surface recession of ablation materials in space flight are necessary for the development and most efficient use of thermal protection materials. In the past, there have been several techniques used to measure surface recession of ablation materials. One such technique consists of monitoring the voltage output of a resistance network having fine loops of wire embedded at predetermined depths in the ablation materials and as the surface recedes, the wire loops burn open, producing step increases in the output voltage. Other techniques involve embedding a capacitor or a resistor in the ablation material such that as the ablation material recedes the capacitor or resistor erodes thus changing its capacitance or resistance. This change in capacitance or resistance is monitored by an electrical circuit. One of the problems involved in the use of these prior techniques is the continually varying resistance in the electrical circuit due to the conductivity of the ionized hot gas cap created during periods of high heat input. Another problem is that many of the ablation materials currently used produce an electrically conducting char-layer on their outer surface. This char-layer causes errors in the measurement of the surface recession. A further problem with these techniques is that they are usable only in electrically nonconducting ablation materials.

It is therefore an object of this invention to provide an improved ablation sensor.

Another object of this invention is to provide an ablation sensor that can be used to measure the surface recession of an ablating material that produces an electrically conducting char-layer.

A further object of this invention is to provide an ablation sensor that can be used to accurately measure the surface recession of an electrically conducting ablating material.

A still further object of this invention is to provide an ablation sensor that can be used to accurately measure the surface recession of an ablating material without interference from the generated ionized hot gas cap during periods of high heat input.

In accomplishing these objects, pieces of ablative material are embedded in the ablation material at different predetermined levels. A spring loaded switch associated with each piece of ablative material is held open by a wire connected between the piece of material and the switch to apply a force to the spring of the switch. When the ablation material recedes to the level of one of the pieces of ablative material the piece melts relieving the force on the spring which allows the switch to close. An electrical circuit including the switches is used to monitor the switches to determine which ones are closed. The closed switches are an indication of the level of surface recession of the ablation material.

Other objects and advantages of this invention will further become apparent hereinafter and in the drawings, in which:

FIG. 1 is a schematic drawing of this invention; and

FIG. 2 is a schematic drawing of an alternative means for anchoring the spring loaded wire in the ablation material.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 in FIG. 1 designates generally the ablation material the recession of which is to be measured. The ablating surface of ablation material 11 is surface 12. In a surface 13, the surface opposite surface 12, several holes 14 are drilled into the ablation material. Each of these holes 14 has a different predetermined depth. A small disk 15 with a wire 16 attached to it is inserted into each hole 14. Disk 15 is made from an ablative material such as aluminum so that when a large amount of heat is applied to it, it melts. A small rod 17 of the same material as 11, with a hole in its center large enough for wire 16 to slide through freely, is fitted into hole 14 to hold disk 15 in place. Each of the wires 16 is attached to a spring loaded switch 18. Switch 18 is normally held in its closed position by a spring 19. Wire 16 is attached to switch 18 so as to apply a force to spring 19 to hold the switch in its open position. Each of the switches 18 is connected across a resistance 20. All of the resistances 20 are connected in series with an output resistance 21 and a battery 22. Output terminals 23 and 24 are connected across output resistance 21.

In operation, the switches 18 are initially in their open positions as is shown in FIG. 1. Then all resistances 20 are in the electrical circuit and the output voltage across terminals 23 and 24 is a minimum. When the ablation material 11 recesses to the level of the first disk 15, the disk will melt. This will relieve the tension on the first wire 16 and allow the first spring 19 to close the first switch 18. The closing of the first switch 18 shorts out the first resistance 20 causing the output across terminals 23 and 24 to increase to a different level. As surface 12 recesses further, additional resistances 20 will be shorted out causing the output voltage across terminals 23 and 24 to increase in steps. Consequently, the output across terminals 23 and 24 at any time is an indication of the recession of surface 12.

The sensor shown in FIG. 1 uses a small disk 15 to support the wire 16. An alternate approach shown in FIG. 2 is to use a small metal tube 25 to support wire 16. The wire 16 passes through the tube 25 from the switch and is attached to the end of the tube. The tube is inserted into the ablation material 11 to some predetermined depth. As the material 11 is ablated away and the end of the tube is exposed to the hot gas cap, the end of the tube melts relieving the tension on wire 16.

The advantages of this invention over prior ablation sensors are numerous. It can be used to measure the surface position of an ablation material in space flight without being affected by the electrical properties of the ablation material, the char-layer created or generated by many ablation materials, or the hot gas cap. The effect of the sensor on the physical properties of the missile skin is minimized in this invention by using the ablation material as the support for the spring loaded wire. The output of this sensor consists of a switch closure and therefore can be used over a wide temperature range without affecting the signal to the telemetry system. In addition, the sensor is a lightweight, compact, rugged device that will withstand severe shock and requires a minimum of associated electronic equipment.

It is to be understood that the form of the invention herewith shown and described is to be taken as a preferred embodiment. Various changes may be made in the shape, size and arrangement of parts. For example, equivalent elements may be substituted for those illustrated and described herein such as having switches 18 normally held open instead of normally held closed by springs 19, parts may be reversed, and certain features of the invention may be utilized independently of the use of other features, all without departing from the spirit or scope of the invention as defined in the following claims.

What is claimed is:

1. An ablation sensor for detecting when an ablation material has ablated to a predetermined level comprising: a piece of ablative material embedded in said ablating material at said predetermined level; a spring loaded switch having two positions; and means attached to said piece of ablative material and to said switch for applying a force to said spring to hold the switch in one of said two positions whereby when said ablating material ablates to said predetermined level said piece of ablative material will melt and relieve the force on the spring causing the spring to actuate the switch to the other of said two positions.

2. An ablation sensor in accordance with claim 1 wherein said means for applying a force to said spring is a wire.

3. An ablation sensor in acocrdance with claim 1 wherein said spring loaded switch is normally held closed by the spring and is open while said force is applied to the spring.

4. A device for measuring the surface recession of an ablating material comprising: several pieces of ablative material embedded in said ablating material at different predetermined levels; a separate spring loaded switch having two positions associated with each of said several pieces of ablative material; means associated with each of said several pieces of ablative material connected to one of said pieces and to the corresponding one of said switches for applying a force to its spring to hold the switch in one of said two positions; and an electrical circuit including said switches for indicating which ones of said switches are in said other position thereby indicating the surface recession of the ablating material.

5. A device in accordance with claim 4 wherein said means for applying a force to a spring is a wire.

6. A device in accordance with claim 5 wherein each of said spring loaded switches is normally held closed by the spring and is open while said force is applied to the spring.

7. An ablation sensor for detecting when an ablation material has ablated to a predetermined level comprising: a hole drilled in a surface of said ablation material opposite the ablation surface to said predetermined level; a disk of ablative material fitted into said holes at said predetermined level; means for holding said disk at said predetermined level; a spring loaded switch having two positions; and means attached to said disk of ablative material and to said switch for applying a force to said spring to hold the switch in one of said two positions whereby when said ablation material ablates to said predetermined level said disk of ablative material will melt and relieve the force on the spring causing the spring to actuate the switch to the other of said two positions.

8. Several ablation sensors in acordance with claim 7 for measuring the recession of said ablation material with the disk of each sensor being located at a different predetermined level and electrical circuit means for monitoring the switches to determine which ones of them have been actuated.

9. An ablation sensor for detecting when an ablation material has ablated to a predetermined level comprising: a hole drilled in a surface of said ablation material opposite the ablation surface to said predetermined level; a tube of ablative material having a closed end fitted into said hole such that said closed end is at said predetermined level; a spring loaded switch having two positions; means attached to the closed end of said tube and to said switch for applying a force to said spring to hold the switch in one of said two positions whereby when said ablation material ablates to said predetermined level the end of said tube will melt and relieve the force on the spring causing the spring to actuate the switch to the other of said two positions.

10. Several ablation sensors in accordance with claim 9 for measuring the recession of said ablation material with the closed end of each tube being located at a different level and electrical circuit means for monitoring the switches to determine which ones of them have been actuated.

References Cited

UNITED STATES PATENTS

| | | | |
|---|---|---|---|
| 3,352,149 | 11/1967 | Sherlock et al. | 73—86 |
| 3,367,175 | 2/1968 | Morreel et al. | 73—86 |
| 2,555,864 | 6/1951 | Strange | 73—358 |
| 2,915,305 | 12/1959 | Craig | 73—86 XR |
| 2,924,975 | 2/1960 | Vernet | 73—358 |
| 3,078,707 | 2/1963 | Weaver | 73—7 |
| 3,238,774 | 3/1966 | Gurtler | 73—170 |

RICHARD C. QUEISSER, *Primary Examiner.*

C. I. McCLELLAND, *Assistant Examiner.*